(12) United States Patent
Seo et al.

(10) Patent No.: US 10,586,960 B2
(45) Date of Patent: Mar. 10, 2020

(54) BATTERY MODULE COMPRISING END PLATES HAVING IMPROVED STRUCUTRE, AND END PLATE MEMBER THEREFOR

(71) Applicant: LG CHEM, LTD., Seoul (KR)

(72) Inventors: Bum-Kyung Seo, Daejeon (KR); Yong-Seok Choi, Daejeon (KR); Jin-Hak Kong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 21 days.

(21) Appl. No.: 15/765,586

(22) PCT Filed: Dec. 9, 2016

(86) PCT No.: PCT/KR2016/014432
§ 371 (c)(1),
(2) Date: Apr. 3, 2018

(87) PCT Pub. No.: WO2017/099513
PCT Pub. Date: Jun. 15, 2017

(65) Prior Publication Data
US 2018/0287116 A1  Oct. 4, 2018

(30) Foreign Application Priority Data

Dec. 9, 2015 (KR) .................. 10-2015-0175244

(51) Int. Cl.
*H01M 2/10* (2006.01)
*H01M 10/04* (2006.01)
(Continued)

(52) U.S. Cl.
CPC ....... *H01M 2/1077* (2013.01); *H01M 2/0212* (2013.01); *H01M 2/0245* (2013.01);
(Continued)

(58) Field of Classification Search
None
See application file for complete search history.

(56) References Cited

U.S. PATENT DOCUMENTS 4,065,603 A * 12/1977 Coibion .............. H01M 2/1077
429/99
8,507,121 B2  8/2013 Saito et al.
(Continued)

FOREIGN PATENT DOCUMENTS

EP        3168899 A1     5/2017
JP        2005-108693 A  4/2005
(Continued)

OTHER PUBLICATIONS

International Search Report (PCT/ISA/210) issued in PCT/KR2016/014432, dated Mar. 30, 2017.

*Primary Examiner* — Scott J. Chmielecki
(74) *Attorney, Agent, or Firm* — Birch, Stewart, Kolasch & Birch, LLP

(57) ABSTRACT

The present disclosure discloses a battery module including a cell assembly including a plurality of cells arranged in a direction, and an end plate member configured to cover at least outermost sides of the cell assembly in the cell arrangement direction, wherein the end plate member includes two or more openings configured as holes bored in a thickness direction of end plates, and a frame part located between neighboring openings and having rigidity.

8 Claims, 4 Drawing Sheets

(51) Int. Cl.
*H01M 2/02* (2006.01)
*H01M 2/04* (2006.01)

(52) U.S. Cl.
CPC .............. *H01M 2/04* (2013.01); *H01M 2/10* (2013.01); *H01M 10/04* (2013.01); *H01M 10/0468* (2013.01)

(56) References Cited

U.S. PATENT DOCUMENTS

| | | |
|---|---|---|
| 8,512,889 B1 | 8/2013 | Ahn |
| 8,846,238 B2 | 9/2014 | Jung |
| 9,083,029 B2 | 7/2015 | Lee et al. |
| 2014/0062418 A1 | 3/2014 | Lim |
| 2016/0036088 A1* | 2/2016 | Tononishi ........... H01M 2/1077 429/152 |

FOREIGN PATENT DOCUMENTS

| | | |
|---|---|---|
| JP | 2011-96478 A | 5/2011 |
| KR | 10-2007-0025734 A | 3/2007 |
| KR | 10-2012-0017296 A | 2/2012 |
| KR | 10-2013-0098212 A | 9/2013 |
| KR | 10-2014-0032165 A | 3/2014 |

* cited by examiner

BATTERY MODULE COMPRISING END PLATES HAVING IMPROVED STRUCUTRE, AND END PLATE MEMBER THEREFOR

TECHNICAL FIELD

The present application claims priority to Korean Patent Application No. 10-2015-0175244 filed on Dec. 9, 2015 in the Republic of Korea, the disclosure of which is incorporated herein by reference.

The present disclosure relates to a battery module, and more particularly, to a battery module having a structure in which end plates are coupled to a cell assembly including a plurality of cells, and an end plate member therefor.

BACKGROUND ART

In general, a battery module includes a plurality of cells connected in series and/or in parallel. The battery module is typically produced in a shape shown in FIG. 1. FIG. 1 illustrates a battery module including a cell assembly 10 including a plurality of cells arranged in a direction, and a case 20 having end plates 21 capable of surrounding the cell assembly 10.

However, when the battery module is swollen due to cell overcharge or the like, the cell assembly 10 is deformed and, at the same time, the end plates 21 at two sides thereof bulge and expand outwards as illustrated in FIG. 2.

Although an inner margin of the battery module may be previously ensured in consideration of the expansion problem, the margin causes an increase in module size and thus may not serve as a proper solution.

Alternatively, a technology of suppressing expansion of a battery module by providing rigid end plates at two sides of a cell assembly is commonly used. However, when expansion of the battery module is forcibly suppressed, cell lifetime (e.g., the state of health (SOH)) may be reduced. That is, expansion should be allowed by a certain degree and lateral maximum displacement due to the expansion should be limited.

As a technology related to swelling of a battery module, Japanese Patent Publication No. 2005-108693 discloses a battery pack capable of preventing changes in the location of the center of laminated cells and the location of electrode terminals by absorbing of a thickness variation of the laminated cells based on elastic transformation of an elastic part when the thickness variation occurs due to a variation in the internal pressure of the laminated cells.

Korean Patent Publication No. 2007-0025734 discloses a secondary battery module capable of preventing bending deformation due to volume expansion of unit batteries, by providing bent parts on end plates of the secondary battery module.

In spite of the disclosure of the above technologies, a technical means capable of allowing a certain degree of expansion of end plates due to swelling and of controlling lateral displacement of the end plates due to the expansion to an appropriate level has not been disclosed and thus a solution thereto is required.

DISCLOSURE

Technical Problem

The present disclosure is designed to solve the problems of the related art, and therefore the present disclosure is directed to providing a battery module having a structure capable of allowing expansion of end plates when the battery module is swollen and of limiting maximum displacement of the end plates, and an end plate member therefor.

Technical Solution

In one aspect of the present disclosure, there is provided a battery module including a cell assembly including a plurality of cells arranged in a direction, and an end plate member configured to cover at least an outermost side of the cell assembly in the cell arrangement direction, wherein the end plate member includes two or more openings configured as holes bored in a thickness direction of an end plate, and a frame part located between neighboring openings and having rigidity.

The frame part may include a first frame extending from a lengthwise center of the end plate member in a height direction of the end plate member, and the openings may be symmetrically provided at two sides of the first frame.

The frame part may include a second frame extending perpendicularly from the first frame in a length direction of the end plate member, and the openings may be symmetrically provided above and under the second frame.

The openings may be provided by rectangular holes extending in a length direction of the end plate member.

In another aspect of the present disclosure, there is also provided an end plate member of a battery module, the end plate member configured to cover an outermost side of a cell assembly in a cell arrangement direction and including two or more openings configured as holes bored in a thickness direction of an end plate, and a frame part located between neighboring openings.

Advantageous Effects

According to the present disclosure, when a battery module is swollen due to cell overcharge or the like, expansion of end plates may be allowed to an appropriate level. As such, rigidity may be ensured and a reduction in cell lifetime may be prevented.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Figure 1:
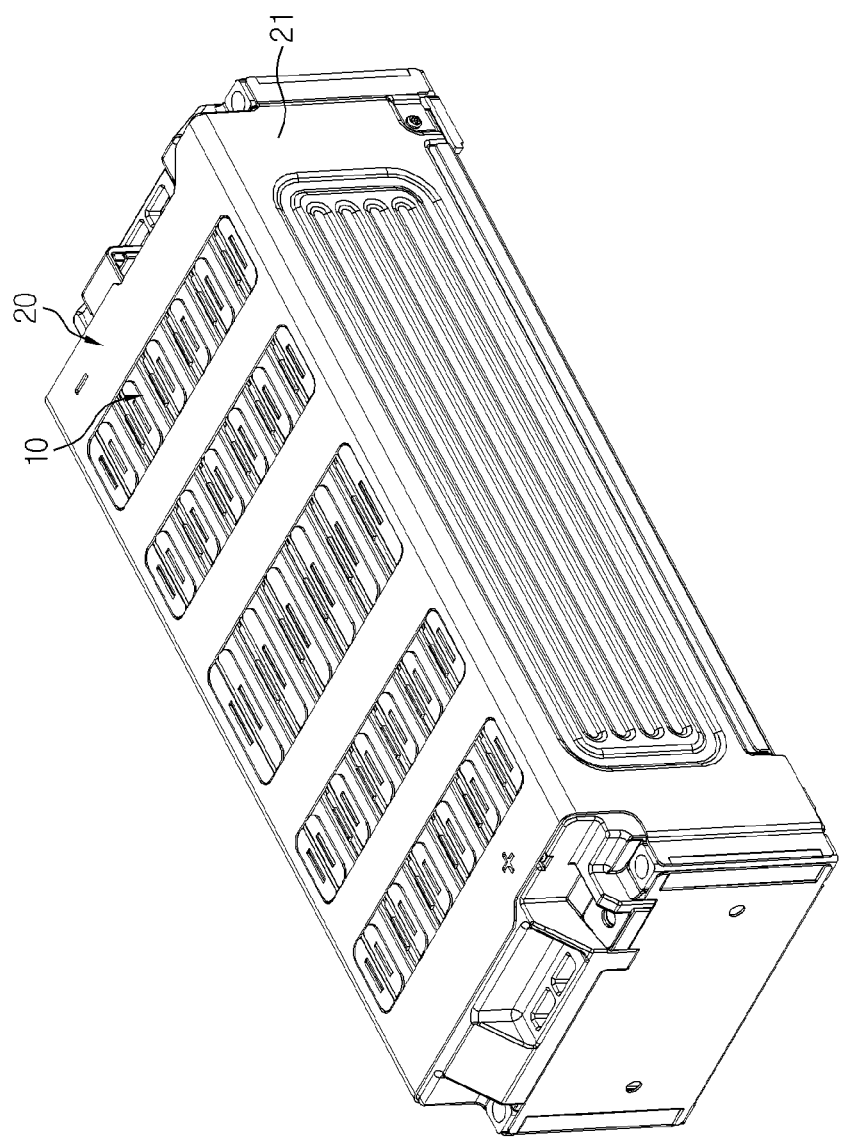
FIG. 1 is a perspective view showing the appearance of a general battery module.
Figure 2:
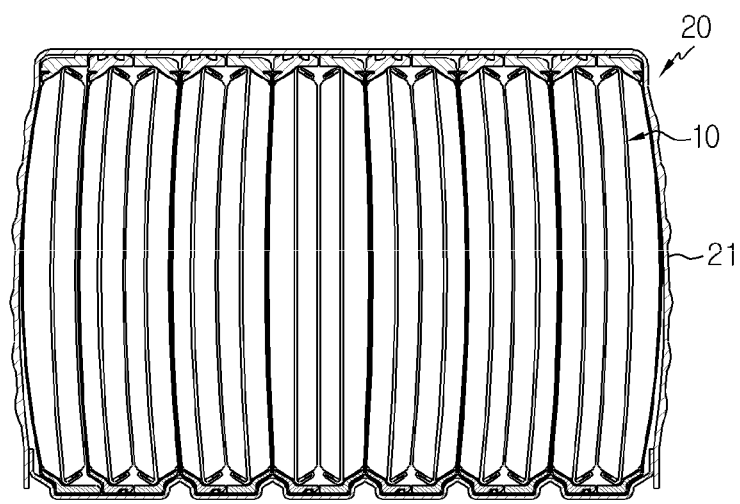
FIG. 2 is a cross-sectional view schematically showing an example in which the battery module of FIG. 1 is swollen.
Figure 3:
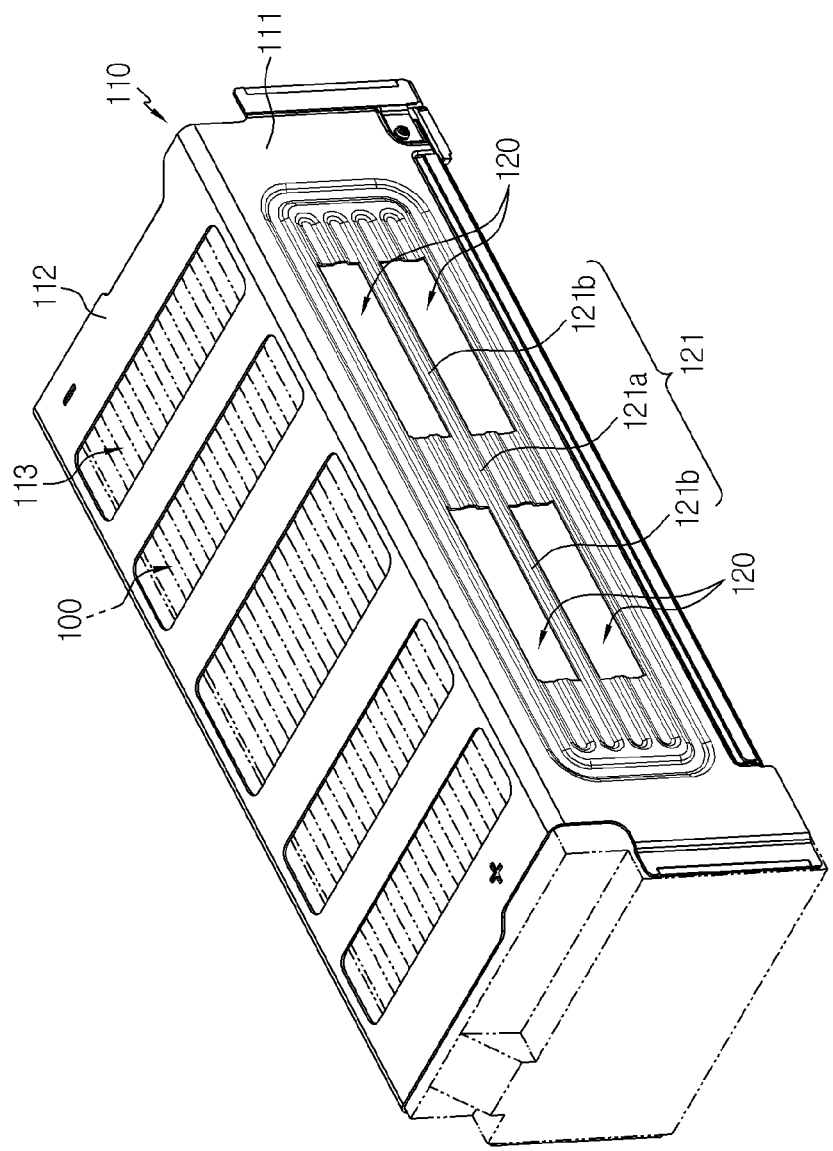
FIG. 3 is a perspective view showing the main configuration of a battery module according to an embodiment of the present disclosure.

FIG. 3 is a perspective view showing the main configuration of a battery module according to an embodiment of the present disclosure.

Referring to FIG. 3, the battery module according to an embodiment of the present disclosure includes a cell assembly 100, and an end plate member 110 having end plates 111 configured to cover two ends of the cell assembly 100.

Each cell of the cell assembly 100 has a thin plate-shaped body and is preferably configured as a pouch-type secondary battery. A plurality of cells are arranged in a direction to configure a stacked structure.

The end plate member 110 includes a pair of front and rear end plates 111 configured to cover two outermost sides of the cell assembly 100 to fix the cells, and an upper plate 112 configured to connect the pair of end plates 111. The end plate member 110 serves to provide mechanical rigidity for the cell assembly 100 and to protect the cell assembly 100 from external impact or the like. In this regard, the end plate member 110 may be made of a metal material such as steel.

The end plate member 110 includes two or more openings 120 configured as holes bored in a thickness direction of the end plates 111, and a frame part 121 located between neighboring openings 120.

The openings 120 are provided by rectangular holes extending in a length direction of the end plate member 110.

The frame part 121 includes a first frame 121a extending from a lengthwise center of the end plate member 110, which corresponds to a location of maximum displacement occurring when the battery module is swollen, in a height direction of the end plate member 110. In this case, the openings 120 are symmetrically provided at two sides of the first frame 121a to symmetrically distribute the location of maximum displacement to two lengthwise sides of the end plates.

In the end plate member 110, to increase the effect of distributing the location of maximum displacement, the frame part 121 includes a second frame 121b. The second frame 121b extends perpendicularly from the first frame 121a in the length direction of the end plate member 110. In this case, the openings 120 adjacent to the second frame 121b are symmetrically provided above and under the second frame 121b. According to this configuration, a location of maximum displacement of the end plate member 110 may be distributed in four directions.

Figure 4:
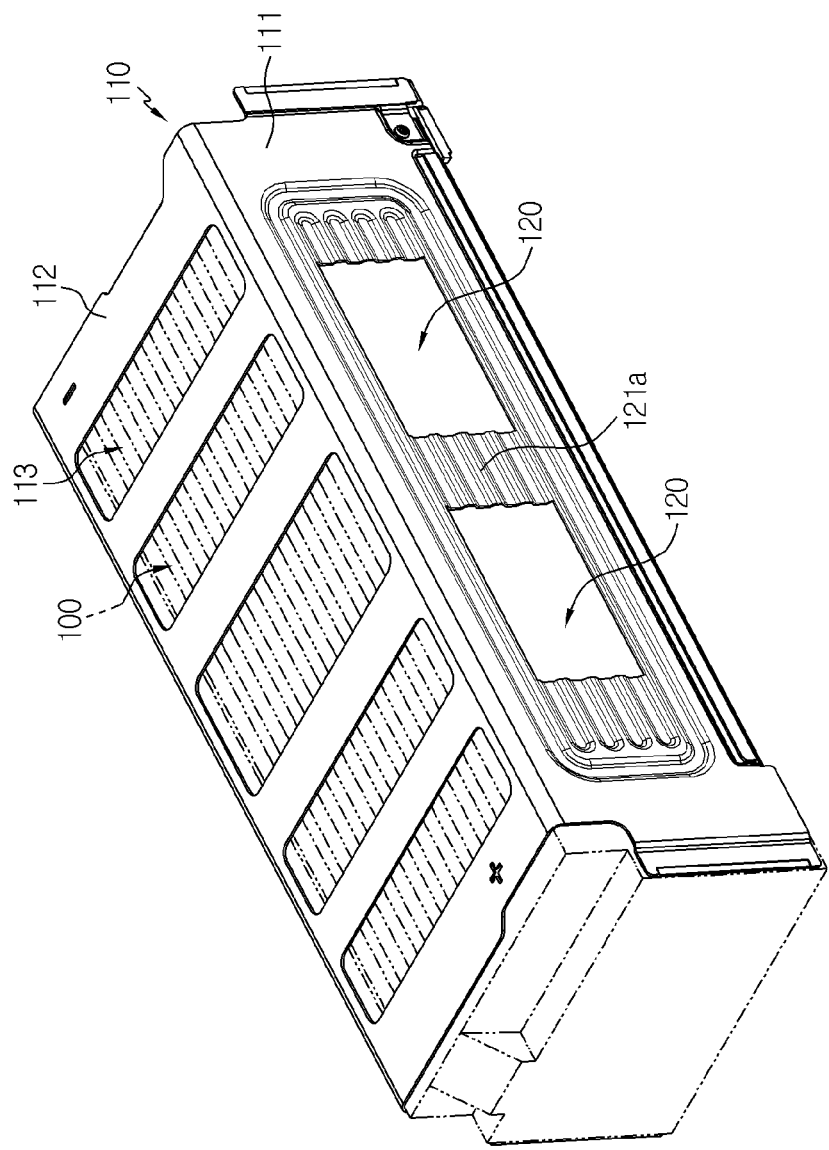
FIG. 4 is a perspective view showing the main configuration of a battery module according to another embodiment of the present disclosure.

When the end plate member 110 includes only the first frame 121a as illustrated in FIG. 4, an opening 120 is provided at each of the two sides of the first frame 121a.

The upper plate 112 connects and integrates top parts of the pair of end plates 111. Additionally, a plurality of through-holes 113 may be provided in the upper plate 112 at predetermined intervals along the length direction of the end plate member 110 to effectively distribute stress.

When the above-described battery module according to an embodiment of the present disclosure is swollen due to cell overcharge or the like and thus maximum displacement occurs at the lengthwise center of the end plate member 110, deformation such as deflection may be suppressed by the first frame 121a having a high rigidity and may be distributed to the adjacent openings 120 having a lower rigidity.

INDUSTRIAL APPLICABILITY

According to the present disclosure, when a battery module is swollen, expansion of an end plate member may be allowed to an appropriate level. As such, the battery module may have rigidity and long lifetime.

What is claimed is:

1. A battery module comprising:
    a cell assembly comprising a plurality of cells arranged in a first direction;
    an end plate member configured to cover at least an outermost side of the cell assembly in the cell arrangement direction, the end plate member having a length in a second direction and a height in a third direction, the length being greater than the height,
    wherein the end plate member comprises two or more openings configured as holes bored in a thickness direction of an end plate, and a frame part located between neighboring openings and having rigidity, the two or more holes being arranged symmetrically in the second direction around a center of the end plate, and
    wherein the two or more openings having a length in the second direction and a height in the third direction, the length being greater than the height.

2. The battery module of claim 1, wherein the frame part comprises a first frame extending from a lengthwise center of the end plate member in a height direction of the end plate member, and
    wherein the openings are symmetrically provided at two sides of the first frame.

3. The battery module of claim 2, wherein the frame part comprises a second frame extending perpendicularly from the first frame in a length direction of the end plate member, and
    wherein the openings are symmetrically provided above and under the second frame.

4. The battery module of claim 1, wherein the openings are provided by rectangular holes extending in a length direction of the end plate member.

5. An end plate member of a battery module, the end plate member configured to cover an outermost side of a cell assembly in a cell arrangement direction, the end plate comprising:
    a length in a second direction and a height in a third direction, the length being greater than the height; and
    two or more openings configured as holes bored in a thickness direction of an end plate, and a frame part located between neighboring openings,
    wherein the frame part extends in the third direction of the end plate and through a center of the end plate, and
    wherein the two or more openings having a length in the second direction and a height in the third direction, the length being greater than the height.

6. The end plate member of claim 5, wherein the frame part comprises a first frame extending from a lengthwise center of the end plate member in a height direction of the end plate member, and
    wherein the openings are symmetrically provided at two sides of the first frame.

7. The end plate member of claim 6, wherein the frame part comprises a second frame extending perpendicularly from the first frame in a length direction of the end plate member, and
    wherein the openings are symmetrically provided above and under the second frame.

8. The end plate member of claim 5, wherein the openings are provided by rectangular holes extending in a length direction of the end plate member.

* * * * *